April 8, 1941. C. G. KRONMILLER Re. 21,765

SWITCH

Original Filed Aug. 6, 1936 2 Sheets-Sheet 1

Inventor
Carl G. Kronmiller
By George H. Fisher
Attorney

April 8, 1941. C. G. KRONMILLER Re. 21,765

SWITCH

Original Filed Aug. 6, 1936 2 Sheets-Sheet 2

Inventor
Carl G. Kronmiller
By George H Fisher
Attorney

Reissued Apr. 8, 1941 Re. 21,765

UNITED STATES PATENT OFFICE 21,765

SWITCH

Carl G. Kronmiller, Minneapolis, Minn., assignor to Minneapolis-Honeywell Regulator Company, Minneapolis, Minn., a corporation of Delaware Original No. 2,165,801, dated July 11, 1939, Serial No. 94,529, August 6, 1936. Application for reissue April 13, 1940, Serial No. 329,550

10 Claims. (Cl. 200—87)

My invention relates to a switch and more particularly to a switch controlled by a condition responsive means.

It is common to employ for various control purposes a switch which will remain in closed position only when some controlling position has a desired value. A particularly common use for such a switch is in a "safety pilot" in a fluid fuel burner control system when the switch will remain closed only when the pilot is burning. In certain of such switches employing an electromagnetic holding means, a manual operating means is provided which is effective to initially close the switch, the switch remaining closed only if the holding means is energized. In prior art devices of this type, it has been possible to close the switch momentarily by the operating means before the electromagnetic means is energized. In other words, each time the operating means is actuated the switch is temporarily closed during such attempt to permanently close the switch. This may have a very definite disadvantage. For instance, in the use just disclosed, wherein the switch operates as a safety pilot, the closing of this switch may under certain circumstances admit fluid to a fuel burner which fuel, by reason of the fact that the pilot is unignited, will itself not be ignited. The result is that each actuation of the operating means admits a certain amount of unignited fuel to the burner which, when the pilot is finally ignited, may lead to disastrous results.

Moreover, in certain cases where an attempt has been made in switches employing other types of holding means to prevent the operating means from changing the circuit controlling position of the switch until the holding means is effective, no means has been provided for preventing the circuit controlling position of the switch being changed again upon an accidental actuation of the operating means after the holding means is effective. Thus, referring again to the use of the switch as a safety pilot, if it is possible to open the switch by actuating the operating means after the burner has been started, the result will be that the burner is extinguished momentarily and if at the same time the pilot burner is extinguished the release of the operating means will cause gas to be admitted to the main burner until the device responsive to the pilot flame has cooled off sufficiently to permanently open the safety pilot switch.

An object of the present invention is to provide a switch controlled by an electromagnet and an operating means for the switch which is effective to move the switch to a desired controlling position only when the electromagnet is energized.

A further object of the present invention is to provide a switch of the type set forth in the previous object in which the electromagnet is energized by a thermocouple.

A further object of the present invention is to provide a switch having an actuating means which is effective to move the switch to a desired controlling position only when a desired condition exists and is ineffective to move said switch from said position.

Other objects of the present invention will be apparent from a consideration of the specification, claims and drawings, of which Figure 1 is a sectional view of one form of my improved switch.

Figure 2:
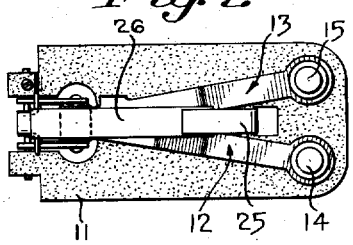
Figure 2 is a view of the contact blade structure and the insulating base supporting said blade structure, said view being taken along the line 2—2 of Figure 1.
Figure 2:
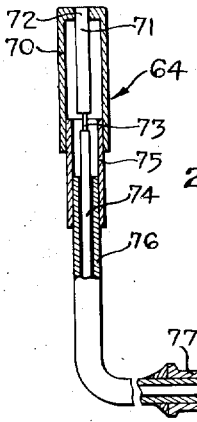
Figure 1:
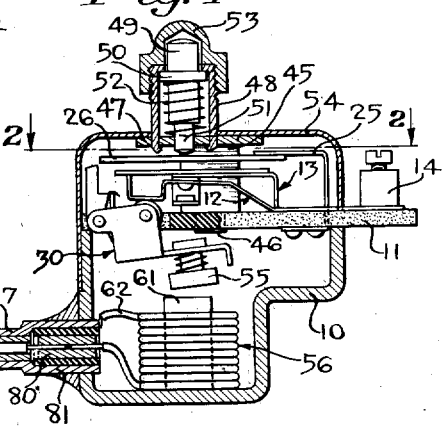

Referring to Figure 1 of the drawings, the switch is mounted in a housing 10 to which is secured an insulating plate 11. Mounted on insulating plate 11 are contact carrying arms 12 and 13, which are secured thereto by terminal posts 14 and 15 respectively.

Figure 3:
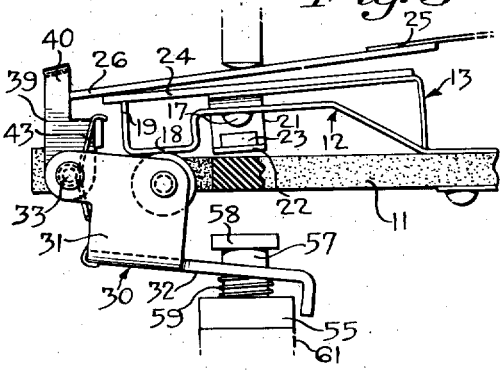
Figure 3 is a view of the portion of the switch apparatus during an intermediate stage of the operation thereof.
Figure 4:
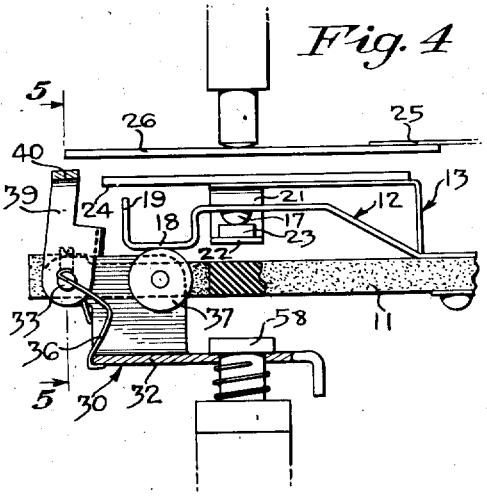
Figure 4 is a view of the switch mechanism in its switch-closed position.

As best shown in Figures 3 and 4, the contact carrying arm 12 extends diagonally upwardly from the base and then horizontally. Secured to the horizontal portion thereof is a contact 17. The outer end of the arm 12 is bent to form a U-shaped portion having a base 18 and an outer leg 19. The arm is of resilient material and by reason of the resiliency thereof is biased downwardly.

The contact carrying arm 13 extends vertically upwardly from the base and then horizontally, terminating in a downwardly extending leg 21 which is bent at 22 to provide a portion lying under the contact 17 of member 12. Secured to this portion is contact 23 which is adapted to cooperate with contact 17. Secured to the horizontal portion of arm 13 is a relatively rigid strip 24 which extends beyond the strip 13 to constitute a horizontal continuation of the same. The arm 13 is of resilient material which resists movement of the arm from the position shown in Figure 1.

Also secured to insulating base 11 is a resilient strip 25 which has secured thereto a relatively rigid strip 26 which overlies the strip 24 and is adapted to cooperate with the same in a manner to be subsequently disclosed. The strip 25 tends to move upwardly by reason of its resilience.

Figure 5:
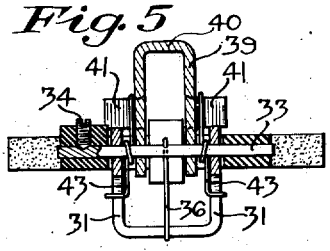
Figure 5 is a detail view taken along the line 5—5 of Figure 4.

A lever 30 is pivotally secured to the insulating plate 11. A portion of this lever is channel-shaped and is provided with side walls 31 and a base portion 32, which base portion 32 extends beyond the side walls 31. The arm 30 is secured to plate 11 through a pivot pin 33 which, as shown in Figure 5, is non-rotatably secured to plate 11 by a set screw 34. A spring 36 has one end extending through the pivot pin 33 and has its other end engaging the base portion 32 of arm 30 so as to urge lever 30 in a counter-clockwise direction. A roller 37 is secured between the two side portions 31 of lever 30 and cooperates with the base portion 18 of the U-shaped portion of contact carrying arm 12. Also mounted on pivot pin 33 is a U-shaped arm 39 which is provided with an end portion 40 which is inclined in such a direction that when it lies under the strip 26 as shown in Figure 4, it is substantially parallel therewith. Arm 39 is provided with two ears 41, as best shown in Figure 5. Two springs 43 are mounted on pivot pins 33 and cooperate with ears 41 and with the side walls 31 of lever 30 so as to urge ears 41 of member 39 into engagement with the upper edge of arm 30. The result is that a strain release connection between arm 39 and lever 30 is provided.

As shown in Figure 1, a U-shaped bracket 45 is secured to the insulating plate 11 through ears 46 which project through the plate 11 and may be secured thereto by crimping or any other suitable manner. The bracket 45 is provided with a central portion 47 which is enlarged so as to have a cylindrical housing member 48 secured thereto. Located in this housing 48 is a push button 49 which is provided with a collar 50 intermediate its two ends. The push button 49 terminates in a reduced stem portion 51 which extends through an aperture in the portion 47 of bracket 45. A spring 52 is located between member 47 and collar 50 and serves to urge push button 49 outwardly. The push button is so located that the stem 51 is adapted to engage strip 26 upon the push button being moved inwardly. A cap 53 is threaded on housing 48 and is adapted to prevent the accidental displacement of push button 49. A cover 54 encloses the upper portion of the switch mechanism.

Associated with lever 30 is an armature 55 which is provided with a stem 57 extending through an aperture in the base portion 32 of arm 30. A flange 58 is provided at the outer portion of stem 57 and a spring 59 is located between armature 55 and member 30 and normally serves to urge the armature 55 to the position relative to lever 30 shown in Figures 1 and 4. The spring 59 and flange 58 serve to provide a strain release connection between armature 55 and arm 32.

The armature 55 is designed to cooperate with an electromagnet 56 which comprises a core 61 and a winding 62. The core 61 is preferably of material of high magnetic permeability. The windings 62 are energized by a thermocouple 64. The thermocouple 64 is provided with the usual members 70 and 71 of different thermoelectric characteristics which are jointed at 72 to provide the hot junction of the thermocouple. While members 70 and 71 may be of any suitable material having desired thermoelectric characteristics, it has been found particularly desirable to make the outer member 70 of a suitable stainless steel which will resist the heat of a pilot flame and the inner member of "Constantan," an alloy consisting of approximately 50% nickel and 50% copper. The inner member 71 is secured to a conductor 73 which is insulated as at 74. The outer member 70 is connected to a copper reducing sleeve 75 which in turn is connected to a copper tubing 76. The copper tubing 76 is electrically connected through a sleeve 77 with one end of the winding 62 of the electromagnet. The sleeve 77 also serves to secure tubing 76 to the casing 10. The inner conductor 73 is secured to the other end of the winding 62 through a coupling sleeve 80 which is insulated from sleeve 77 through a suitable insulating bushing 81.

In order for the extremely small electro-motive force which is generated by the difference in temperature between the hot junction 72 and the cold junction, to produce a sufficient holding action in the electromagnet, it is necessary that the resistance of the circuit energized by the thermocouple be extremely low. In order for this to be true it is necessary that conductors 74, copper tubing 76 and the conductor constituting the winding 62, be of a relatively large size so as to offer little resistance to the flow of current.

Figure 6:
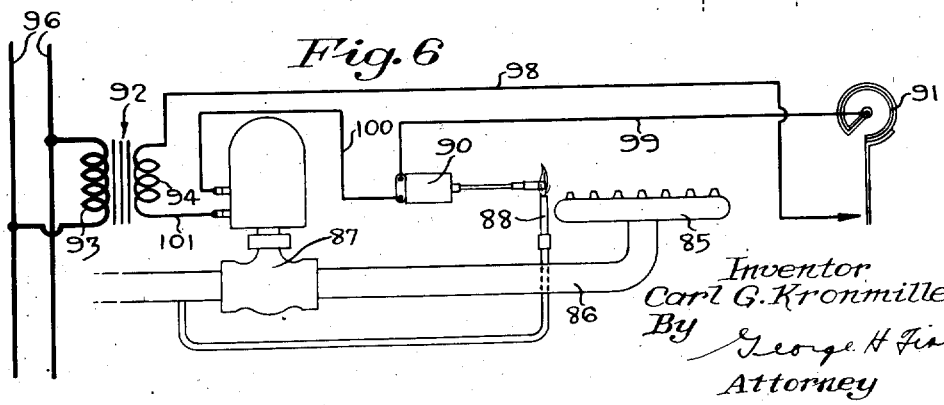
Figure 6 is a schematic view of one application of the improved switch.

As previously stated, one application for which the switch is particularly designed is that of a safety pilot in a fuel burner control system. Such an application is shown schematically in Figure 6 of the drawings. Referring to said figure, a gas burner 85 is supplied with gas through a pipe 86. The flow of gas through pipe 86 to burner 85 is controlled by a valve 87 of any suitable electrically operated type. For the purposes of illustration, the valve 87 may be of a motor operated type. A pilot burner 88 is associated with the main gas burner 85 and it is desired that it be impossible to open the main gas valve 87 unless this pilot is burning. The improved switch of the present invention is designated in its entirety in this figure by the reference numeral 90. The motor of valve 87 is under the joint control of this switch and a thermostatic switch 91 of any suitable construction.

A stepdown transformer 92 supplies power for the operation of the valve. This transformer comprises a high voltage primary 93 connected to line wires 96 and a low voltage secondary 94. The secondary 94 is connected through a conductor 98 with a fixed contact of the thermostat 91. Conductor 99 connects the other terminal of the thermostat with one terminal of switch 90 and a conductor 100 leads from the other terminal of the switch 90 to one terminal of a valve operating mechanism of valve 87, the other terminal of which is connected to secondary 94 by a conductor 101. It will be readily apparent that when switch 90 is open it is impossible to establish a circuit to the valve operating mechanism of valve 87 even though thermostat 91 be closed. It is accordingly imperative in order for the valve 87 to be opened that switch 90 be closed. For a reason which will be more apparent from the subsequent description of the operation of the switch, it is impossible to close switch 90 unless the pilot 88 is burning.

The switch is shown in Figure 1 in the position assumed when the pilot is extinguished. Under these conditions, the biasing action of spring 36 urges the lever 30 in a counter-clockwise direction and due to the action of roller 37 pressing against portion 18 of contact carrying arm 12, the latter arm is held in the position shown in Figure 1 against the action of its own resiliency, which tends to urge it downwardly. The contact arm 13 tends to assume the position shown in Figure 1 by reason of its inherent resiliency. The resiliency of member 25 tends to hold the rigid strip 26 substantially in engagement with push button 49. Due to the fact that the energization of the electromagnet by thermocouple 64 is relatively small, armature 55 will not be moved by the magnet downwardly into engagement with the magnet from the position shown in Figure 1. It is necessary if there is to be any co-action between the electromagnet 56 and armature 55 for these two members to be brought into engagement. The push button mechanism is for this purpose.

Upon push button 49 being moved inwardly with respect to plate 11, the plate 26 will first engage plate 24 and will then urge arm 12 downwardly through its engagement with the outer leg 19 of arm 12. Due to the fact that the contact 23 is rigidly secured with respect to contact arm 13 and that the spacing of contact carrying arms 12 and 13 is fixed when contact arm 13 is being moved downwardly by reason of the leg 19, the downward movement of these members by the actuation of push button 49 does not cause engagement of contacts 17 and 23. Upon push button 49 being moved completely inwardly the parts assume the position shown in Figure 3. It will be noted that the arm 39 has moved against the end of plate 26 where it is resiliently held by the action of springs 43 which, as previously stated, tend to urge ears 41 into engagement with arm 30. It will be further noted that the downward movement of contact arm 30 has caused armature 55 to be moved into engagement with the core 61 of electromagnet 56. As previously stated, the spring 59 functions to provide a strain release connection between arm 30 and armature 55 so as to insure a firm seating of armature 55 with core 61 of electromagnet 56.

If the pilot burner is not ignited so that electromagnet 56 is not energized, the release of push button 49 will cause the parts to all return to the position shown in Figure 1. It will be noted that during this entire action, contacts 17 and 23 are maintained spaced so that it is impossible to even momentarily close the circuit to the gas valve 87.

If, however, when the parts are moved to the position shown in Figure 3 by reason of push button 49 being moved inwardly, the pilot burner is lighted so that electromagnet 56 is energized, armature 55 will be held in engagement with the electromagnet. Under these circumstances the arm 30 will not be permitted to return to the position shown in Figure 1 but will move in a counter-clockwise direction merely until the portion 32 thereof engages the flange 58 as shown in Figure 4. Due to the fact that the switch arm 12 is biased downwardly by reason of its own resilience, its upper motion will terminate as soon as the portion 32 of lever 30 engages flange 58. Arm 13 will, on the other hand, continue to travel upwardly by reason of being biased upwardly because of its resilience with the result that upon push button 49 reaching its uppermost position the various parts will be in the position shown in Figure 4, wherein contacts 17 and 23 are in engagement. It will be noted that the actuation of push button 49 results in contacts 17 and 23 being brought into engagement only when the pilot is ignited.

Referring to Figure 4, it will be noted that the portion 40 of arm 39 lies underneath the strip 26. Referring to Figure 3 it will be noted that the only thing which tends to prevent arm 39 from rotating in a clockwise direction with respect to lever 30 is the engagement of this arm with the end of strip 26. When this strip moves upwardly due to the push button being released, springs 43 will be effective to move arm 39 to the position shown in Figure 4. If it is now attempted to change the position of the switch by actuation of push button 49, rigid strip 26 will never be moved into engagement with strip 24 due to the fact that it will first engage arm 40 and further downward movement of strip 26 will be prevented. The result is that it is impossible to even momentarily open the circuit to the actuating means of gas valve 87. For the reasons previously pointed out, this is a considerable advantage over prior structures.

In Figures 7 to 11 of the drawings a modified form of the switch is shown. The principal difference between the modified switch and the one previously described is that this switch is partly adapted for the control of a three-wire circuit as distinguished from a two-wire circuit for which the previously described switch was adapted. There are also certain differences in constructional detail which are of general applicability to either a two-wire or a three-wire type of switch.

Figure 7:
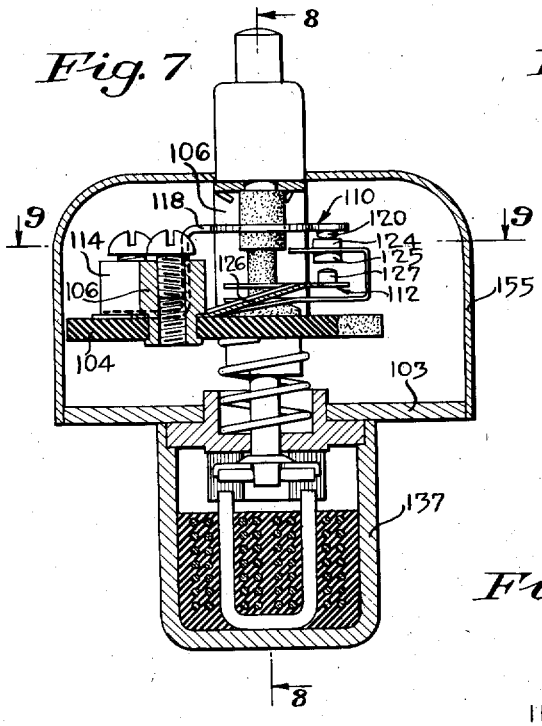
Figure 7 is a section view of a modified form of the switch, the section being taken along the line 7—7 of Figure 9.
Figure 8:
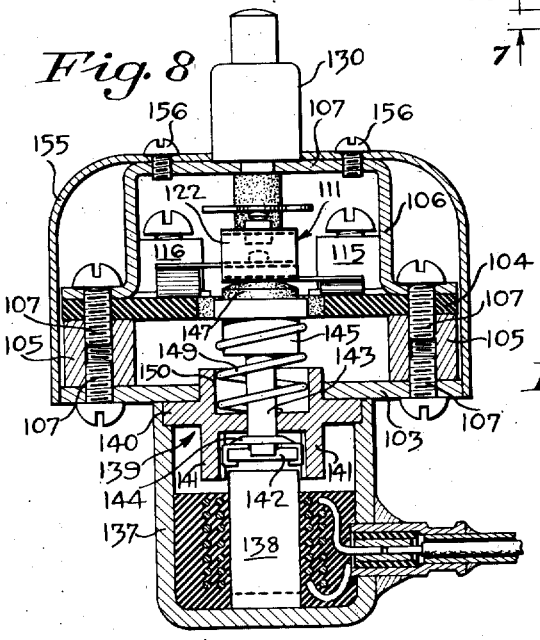
Figure 8 is a sectional view of the switch shown in Figure 7, the section being taken along the line 8—8 of Figure 7.

Referring to Figures 7 and 8, a base plate is designated by the reference numeral 103. Located above this plate 103 is an insulating plate 104 which is supported on base plate 103 by spacers 105. A bracket 106 of inverted U-shape is located upon the insulating plate 104. Screws 107 serve to connect plate 103, insulating plate 104 and bracket 106 to the spacers 105, and to secure these members together in assembled relation.

Figure 11:
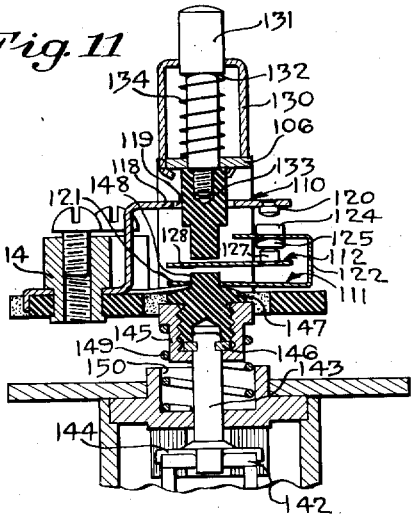
Figure 11 is a detailed view of a portion of the switch operating mechanism with the switch members in a position assumed when the contacts are in a second circuit controlling position, the section being taken along the line 11—11 of Figure 9.
Figure 9:
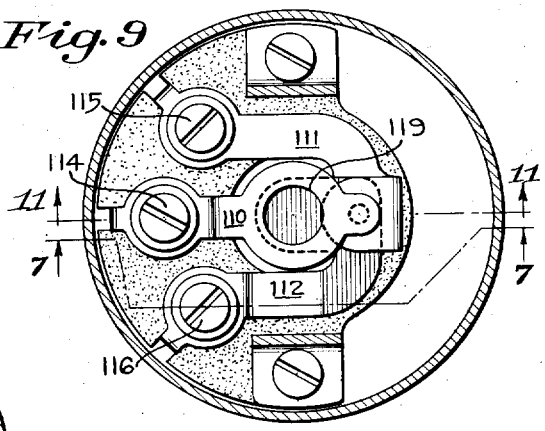
Figure 9 is a sectional view of the modified switch along the line 9—9 of Figure 7.

Also mounted upon insulating plate 104 are contact carrying arms 110, 111 and 112. These contact carrying arms are, as best shown in Figures 9 and 11, secured to the plate 104 through terminals 114, 115 and 116 respectively.

The contact carrying arm 110 is relatively rigid. This arm after leaving the terminal 114 first extends vertically and then terminates in a horizontal portion 118. This horizontal portion is enlarged adjacent its midpoint and extending through this enlarged portion is a circular opening 119. Secured at the outer end of horizontal portion 118 on the underside thereof is a contact 120.

Figure 10:
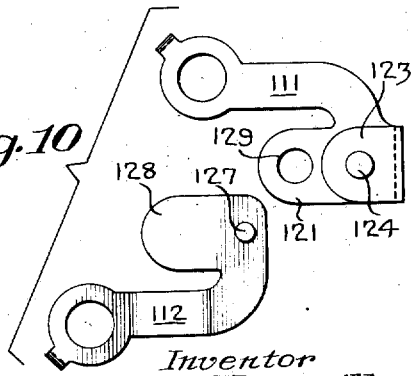
Figure 10 is a detail view of two of the contact carrying members.

The contact arm 111 is of more or less resilient material and is so disposed that it tends to move downwardly by reason of its resiliency. This arm, as best shown in Figures 10 and 11, is provided with an ear portion 121 which lies under the circular opening 119 of contact carrying member 110. This ear portion 121 is provided with an aperture 129 therethrough which aperture is aligned with aperture 119. Arm 111 is further provided with a vertically extending portion 122 and extending from the last named portion is an ear 123 parallel to ear 121. Secured to the opposite sides of ear 123 are contacts 124 and 125 which are aligned in a vertical direction with contact 120. Contacts 120 and 124 are adapted to cooperate with each other and are shown in engagement in Figures 7 and 8.

The contact carrying arm 112 is also of resilient material and is so formed that the outer portion of this arm tends to move upwardly by reason of the resiliency of the arm. This arm is provided with a portion 126 which extends diagonally upwardly and terminates in a horizontal portion to the upper side of which a contact 127 is secured. The horizontal portion is formed so as to provide an ear 128 which is adapted to be aligned with apertures 119 and 129.

Secured to the upper horizontal portion of bracket 106 is a cylindrical housing member 130. This member houses a push button 131 corresponding in function to push button 49 of the previously described species. Push button 131 is provided with a shoulder 132 and is threadedly connected to a cylindrical memer 133 of insulating material which is located on the opposite side of bracket 106 from the portion of push button 131 which is manually operated. A spring 134 is located between member 106 and shoulder 132 and serves to bias the push button outwardly. The outward movement of push button 131 is limited by reason of the engagement of the cylindrical insulating member 133 with bracket 106. The cylindrical member 133 extends through opening 119 and is adapted to engage the ear 128 of contact carrying arm 112.

Secured to the base plate 103 is an electromagnet housing 137. Located within this housing 137 is an electromagnet 138. A member 139 functions as a closure for the electromagnet housing, as a guide for the armature cooperating with the electromagnet, and as a spring bearing member. This member is provided with a collar 140 which is clamped between a shoulder of housing 137 and the base plate 103. Extending downwardly from the central portion of member 139 are two spaced members 141 which function as guides for an armature 142 which is adapted to cooperate with the electromagnet 138. The armature 142 is secured to a stem 143 through a clip 144. Secured to the upper end of stem 143 is a cup-like member 145 as best shown in Figure 11. An insulating stud 147 is threaded into the cup-like member 145 and a split ring 146 is located between these two members and serves to secure the same to stem 143. Insulating stud 147 is provided with a reduced portion 148 at its upper end which extends through the opening 129 in contact carrying member 111. A spring 149 bears at one end against member 145 and at the other end against the base of a recessed portion 150 of member 139, which recessed portion serves as a bearing for spring 149. The spring 149 serves to bias member 145 and consequently stud 147 upwardly so as to maintain contact carrying member 111 in an upper position such as shown in Figure 7 wherein contacts 120 and 124 are in engagement.

A cover 155 extends over the switch mechanism and is secured in place by screws 156 serving to connect the cover with bracket 106.

Due to the fact that the thermocouple structure is the same as that shown in the previously described species, a separate showing of the same in connection with the present species has not been made. It is furthermore believed unnecessary to repeat the description of the various details of the electromagnet and the method of connecting the leads from the thermocouple to the electromagnet.

The various elements of the switch are shown in Figures 7 and 8 in the position which they assume when the electromagnet is deenergized due to the absence of a flame adjacent the thermocouple. In this position contacts 120 and 124 are in engagement. When it is desired to bring contacts 125 and 127 into engagement, the push button 131 is pressed downwardly. The actuation of push button 131 causes insulating member 133 to move downwardly. The downward movement of insulating member 133 causes its engagement with ear 128 of contact carrying arm 112, causing the latter member to move downwardly. At the same time the downward motion of member 133 is transmitted through ear 128 to stud 147, causing the latter member to also move downwardly. As previously stated, contact carrying arm 111 is biased downwardly and is held in the position shown in Figure 11 only by reason of the biasing action of spring 149 acting through members 145 and 147 to move arm 111 upwardly. Upon the downward movement of member 147, contact carrying arm 111 is free to move downwardly, moving down substantially simultaneously with contact carrying arm 112. As a result both members are shifted in position but contacts 125 and 127 are not allowed to move into engagement.

The downward movement of stem 143 causes armature 142 to be moved into engagement with electromagnet 138. Due to the fact that armature 142 is now in direct engagement with magnet 138, the latter will be effective to hold the armature if the thermocouple is being heated. If the thermocouple is not being heated the release of push button 131 will restore the parts to the position shown in Figures 7 and 8, thus causing re-engagement of the contacts 120 and 124 without having at any time effected engagement of contacts 125 and 127. Due to the fact that in a normal use of this apparatus in three-wire circuits, the engagement of contacts 125 and 127 would effect the operation of the fuel supplying apparatus, it is highly important that these contacts not be engaged even momentarily for a reason similar to that set forth in connection with the previously described species of the apparatus.

If, however, the pilot is burning properly and armature 144 is held in engagement with magnet 128, stud 147 is held in its lowermost position as indicated at Figure 11. Due to the fact that as previously mentioned contact carrying arm 111 is biased downwardly, this arm will remain in its lowermost position as indicated in Figure 11. Upon the release of push button 131, arm 112 will be free to travel upwardly due to its natural bias and will cause contact 127 to move into engagement with contact 125.

It will be readily seen that as in the first described species, the engagement of the contacts which cause operation of fuel feeding means or which bring about a normal running condition of the system being controlled, is not effected by operation of the initial resetting means unless the electromagnet is energized by reason of the existence of a desired condition such as the ignition of the pilot burner. Moreover, this object has been accomplished in both species with an extremely simple mechanism which has a minimum number of moving parts.

While certain specific embodiments of the present invention have been shown and described, it is to be understood that these are for purposes of illustration only and that my invention is to be limited only by the accompanying claims.

I claim as my invention:

1. In combination, a switch movable between first and second controlling positions and biased to a first position, holding means comprising an electromagnet for holding an element associated with said switch in a position wherein said switch is biased to said second controlling position, actuating means for moving said switch, without moving the same to said second controlling position, to a position wherein said element is held by said holding means if said electromagnet is energized, said biasing means being operative upon further movement of said actuating means to move said switch to said second controlling position, and means to prevent movement of said switch from said second circuit controlling position by said actuating means.

2. In combination, a switch movable between first and second controlling positions, means biasing said switch to said first position, holding means comprising an electromagnet for holding an element of said biasing means in a position wherein the latter is effective to bias said switch to said second controlling position, actuating means for moving said element of said biasing means, without affecting the circuit controlling position of said switch, to a position wherein said holding means is effective if energized, and means effective upon said switch being moved to said second controlling position to prevent movement of the same from said position by said actuating means.

3. In combination, a pair of resilient contact carrying members tending by reason of their own resilience to move to a first circuit controlling position, biasing means normally acting on said contact carrying members to urge the same against their resilience into a second circuit controlling position, holding means for retaining said biasing means in a position wherein said contact carrying members are not affected thereby, actuating means operative upon movement thereof in one direction to move said biasing means while preventing said contact carrying members from moving to said first circuit controlling position, into a position wherein said biasing means may be retained by said holding means if effective, said members being operative upon further movement of said actuating means to move to said first circuit controlling position by reason of their own resilience.

4. In combination, a pair of resilient contact carrying members tending by reason of their own resilience to move to a first circuit controlling position, biasing means normally acting on said contact carrying members to urge the same against their resilience into a second circuit controlling position, holding means for retaining said biasing means in a position wherein said contact carrying members are not affected thereby, actuating means including a reciprocable member operative upon movement of said member in one direction to move said biasing means while preventing said contact carrying members from moving to said first circuit controlling position, into a position wheren said biasing means may be retained by said holding means if effective, said contact carrying members being operative upon movement of said reciprocable member in the opposite direction to move to said first circuit controlling position by reason of their own resilience.

5. In combination, three contact carrying members, a first of which is substantially immovable and a second and third of which are movable, said second member being biased into a contact making position with respect to said first member, reciprocable means for moving said second and third contact carrying members without changing the relation of the contacts carried thereby, and means operable when said members are so moved by actuation of said reciprocable means in one direction to hold an element associated with one of said members so that upon actuation of said reciprocable means in the opposite direction, only one of said two contact carrying members returns in the direction of its original position whereby the contacts carried by said second and third members are brought into engagement.

6. In combination, a switch normally resting in a predetermined circuit controlling position, means to move said switch back and forth without changing its circuit controlling position, an electromagnet member and an armature member, one of said members being operated by said means to bring the same adjacent the other of said members, means to move said switch to another circuit controlling position when said members are held adjacent each other by reason of the energization of said electromagnet upon movement of said switch moving means to a position in which said members would otherwise be moved apart, and means to prevent further actuation of said switch moving means from changing the circuit controlling position of said switch.

7. In combination, a pair of resilient contact carrying members tending by reason of their own resilience to move to a first circuit controlling position, an element adapted to engage one of said contact carrying members and biased so as to hold said member out of said first controlling position with respect to said other contact carrying member, an armature secured to said element, an electromagnet adapted upon energization thereof to hold said armature when said members are positioned adjacent each other, reciprocable means operable upon movement in one direction to move said element so as to cause engagement of said armature and electromagnet while preventing movement of said contact carrying members to said first controlling position, said members being operable upon the armature being held by said electromagnet and upon movement of said reciprocable means in the other direction to move to said first controlling position.

8. In combination, a switch movable between first and second controlling positions and biased to a first position, selectively operable holding means for holding an element associated with said switch in a position wherein said switch is biased to said second controlling position, actuating means for moving said switch, without moving the same to said second controlling position, to a position wherein said element is held by said holding means if operative, said biasing means being operative upon further movement of said actuating means to move said switch to said second controlling position, and means to prevent movement of said switch from said second circuit controlling position by said actuating means.

9. In combination, a pair of resilient contact carrying members, one of said members having a contact carrying portion extending around the contact carrying portion of the other member so that the contacts carried by said members are moved into engagement when said members are moved apart, biasing means urging a first of said members towards the other so as to urge said contacts apart, holding means for preventing said biasing means from affecting the position of said first member, said holding means comprising an electromagnet and an armature, and a reset member operable when moved in one direction to force said other member into engagement with said first member and move said first member to the position it normally occupies when the contacts carried by said members are engaged, said first switch member remaining in said position when said reset member is moved in the other direction if said armature is retained by said electromagnet and said other switch member moving back by reason of its resilience away from said first member to cause engagement of said contacts.

10. In combination, a pair of resilient contact carrying members, one of said members having a contact carrying portion extending around the contact carrying portion of the other member so that the contacts carried by said members are moved into engagement when said members are moved apart, biasing means urging a first of said members towards the other so as to urge said contacts apart, holding means for preventing said biasing means from affecting the position of said first member, said holding means comprising an electromagnet and an armature, and a reset member operable when moved in one direction to reset said armature with respect to said electromagnet and to force said other member into engagement with said first member and move said first member to the position it normally occupies when the contacts carried by said members are engaged, said first switch member remaining in said position when said reset member is moved in the other direction if said armature is retained by said electromagnet and said other switch member moving back by reason of its resilience away from said first member to cause engagement of said contacts.

CARL G. KRONMILLER.